United States Patent
Schwarze

[19]

[11] Patent Number: 5,950,803
[45] Date of Patent: *Sep. 14, 1999

[54] CONVEYOR BELT STRIPPING DEVICE

[76] Inventor: Hans-Otto Schwarze, Esseler Strasse 170, 45665 Recklinghausen, Germany

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/669,335

[22] PCT Filed: Dec. 8, 1994

[86] PCT No.: PCT/EP94/04075

§ 371 Date: Sep. 17, 1996

§ 102(e) Date: Sep. 17, 1996

[87] PCT Pub. No.: WO95/19310

PCT Pub. Date: Jul. 20, 1995

[30] Foreign Application Priority Data

Jan. 12, 1994 [DE] Germany .......................... 94 00 258 U

[51] Int. Cl.[6] .................................................. B65G 45/00
[52] U.S. Cl. .......................................... 198/499; 198/497
[58] Field of Search ...................................... 198/497, 499

[56] References Cited

U.S. PATENT DOCUMENTS

| | | | |
|---|---|---|---|
| 3,994,384 | 11/1976 | Reiter | 198/497 |
| 4,359,150 | 11/1982 | Bowman et al. | 198/499 |
| 4,850,474 | 7/1989 | Schwarze | 198/499 |
| 5,082,106 | 1/1992 | Schwarze | 198/499 |
| 5,518,107 | 5/1996 | Schwarze | 198/499 |

*Primary Examiner*—Joseph E. Valenza
*Assistant Examiner*—Joe Dillon, Jr.
*Attorney, Agent, or Firm*—Webb Ziesenheim Logsdon Orkin & Hanson, P.C.

[57] ABSTRACT

An arrangement to strip unwanted matter from belt bands in conveyor belt installations, comprises a systems support attached to a supporting structure for the belt band and stripping members each having a scraper blade spring-loaded in the ready-to-operate position against the belt band in a peeling fashion, and can, when the scraper blade encounters obstacles adhering to the belt band, pivot away and subsequently pivot back into the ready-to-operate positions. The blade support is supported by a pivot bearing having a limited pivot angle such that the scraper blade can adjust to changes in inclination of the belt band.

19 Claims, 7 Drawing Sheets

CONVEYOR BELT STRIPPING DEVICE

FIELD OF THE INVENTION

The invention relates to an arrangement to strip unwanted matter from belt bands in conveyor belt installations in the region of a driving and/or direction-changing roller of the belt band.

BACKGROUND OF THE INVENTION

Arrangements are known (DE-C 23 65 415) which serve to remove material which continues to adhere to the belt band downstream of the point of discharge.

It is also known to strip unwanted matter on belt bands directly on the driving and direction-changing rollers by means of rubber lips which are arranged in corresponding mountings on the frame which supports the belt band. The rubber lips abut, either at right angles or at an inclination, against the belt band, which is guided about the direction-changing or driving roller.

Finally, conveyor belt stripping means are known which comprise scraper blades (EP-OS 0 450 133) which are mounted in the supporting structure, which supports the belt band, directly on the discharge roller below the discharge parabola of the belt band or behind the discharge roller at the intake end of the return belt.

It is the object of the invention to provide an arrangement to strip unwanted matter from belt bands, which arrangement is suitable for use on belt bands directly in the region of a driving and/or a direction-changing roller of a conveyor belt installation and which operates reliably and without the danger of causing damage to the belt band.

SUMMARY OF THE INVENTION

Briefly according to this invention there is provided a system to strip unwanted matter from belt bands in conveyor belt installations in the region of a driving and/or direction-changing roller of the belt band, comprising a systems support which is attached to a supporting structure for the belt band and on which at least one stripping member is arranged. The stripping member comprises a scraper blade which is attached to a blade support, which scraper blade, in the ready-to-operate position, abuts against the belt band and comprises a torsion spring joint on which the blade support is guided in a spring-loaded manner and so as to pivot about a horizontal pivot axis. When the scraper blade encounters obstacles which rigidly adhere to the belt band, it can pivot away and subsequently again pivot back into the working position on the belt band. The blade support is pivotally supported by a pivot bearing having a limited pivot angle, such that the scraper blade which abuts against the belt band can adjust to changes in inclination of the belt band in the immediate contact region of the scraper blade by pivoting automatically. The torsion spring joint is attached to a plug-in means which is arranged in a holding means which is attached to the systems support. The longitudinal axis of the plug-in means intersects the belt band at a point which, in the direction of rotation of the roller, is disposed upstream of the contact line of the scraper blade.

The system according to the invention in particular has the advantage that good stripping results are achieved in that the spring tension of the torsion spring joint, which tension acts on the scraper blade, is sufficient to press the scraper blade against the belt band, which is supported on the roller, and in that, as a result of the limited capacity of the scraper blade to pivot. There is a continuous adjustment to position-changing sections of the belt band, and in that it is readily possible for the stripping member to carry out a yielding movement if this is required due to unevenness in the plane or surface of the belt band.

In addition, the system according to the invention has the advantage that it is a simple and readily maintained construction and is readily attached to a systems support and is readily detachable therefrom, for example in order to be exchanged.

BRIEF DESCRIPTION OF THE DRAWINGS

Preferred exemplified embodiments of the stripping arrangement according to the invention are illustrated in the drawing, in which.

DESCRIPTION OF THE PREFERRED EMBODIMENTS

The arrangement illustrated in FIGS. 1 to 4 serves to strip unwanted matter from a belt band 2 in the region of a roller 3. The roller 3 may be a driven roller or a direction-changing roller without drive.

The arrangement 1 comprises a systems support 4 on which are arranged stripping member which are described in more detail hereinafter.

The systems support 4 is secured at its two ends to, in each case, one twin torsion spring rocker 7 via an L-shaped profiled part 6 which is arranged there.

The short leg of each profiled part 6 is welded to a supporting ring 6a (see also FIGS. 5 to 7) which is secured, so as to be adjustable, to the systems support 4 by means of screws, and the long leg of each profiled part is provided with a series of equidistantly spaced bores 9. At its end facing the systems support 4, the twin torsion spring rocker 7 comprises a plate-shaped connecting piece 10 which is also provided with equidistantly spaced bores 11 which are in alignment with the bores 9 in the profiled part 6. The profiled part 6 and the connecting piece 10 are interconnected by means of screws 12.

Figure 1:
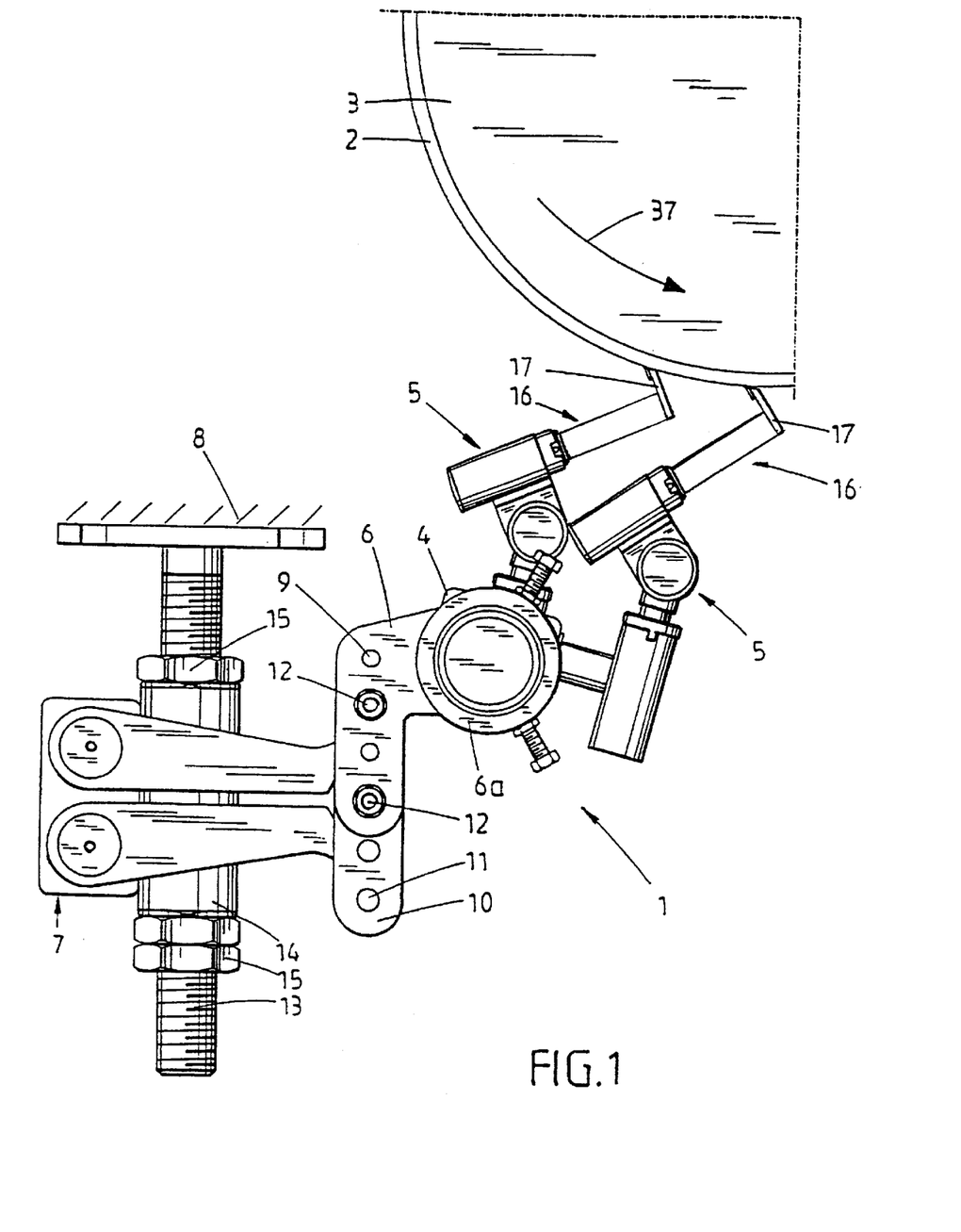
FIG. 1 is a side view of a first embodiment of the stripping arrangement comprising two stripping members which are arranged in different positions on a systems support.

A threaded rod 13, which passes through a guide bush 14 which is connected to the twin torsion spring rocker 7, is secured to each side of a belt band supporting structure 8 which is indicated only in minimal detail in FIG. 1. The guide bush 14 is locked in position by means of nuts 15 which are screwed on to the threaded rod 13 in a manner so as to be vertically adjustable.

Figure 2:
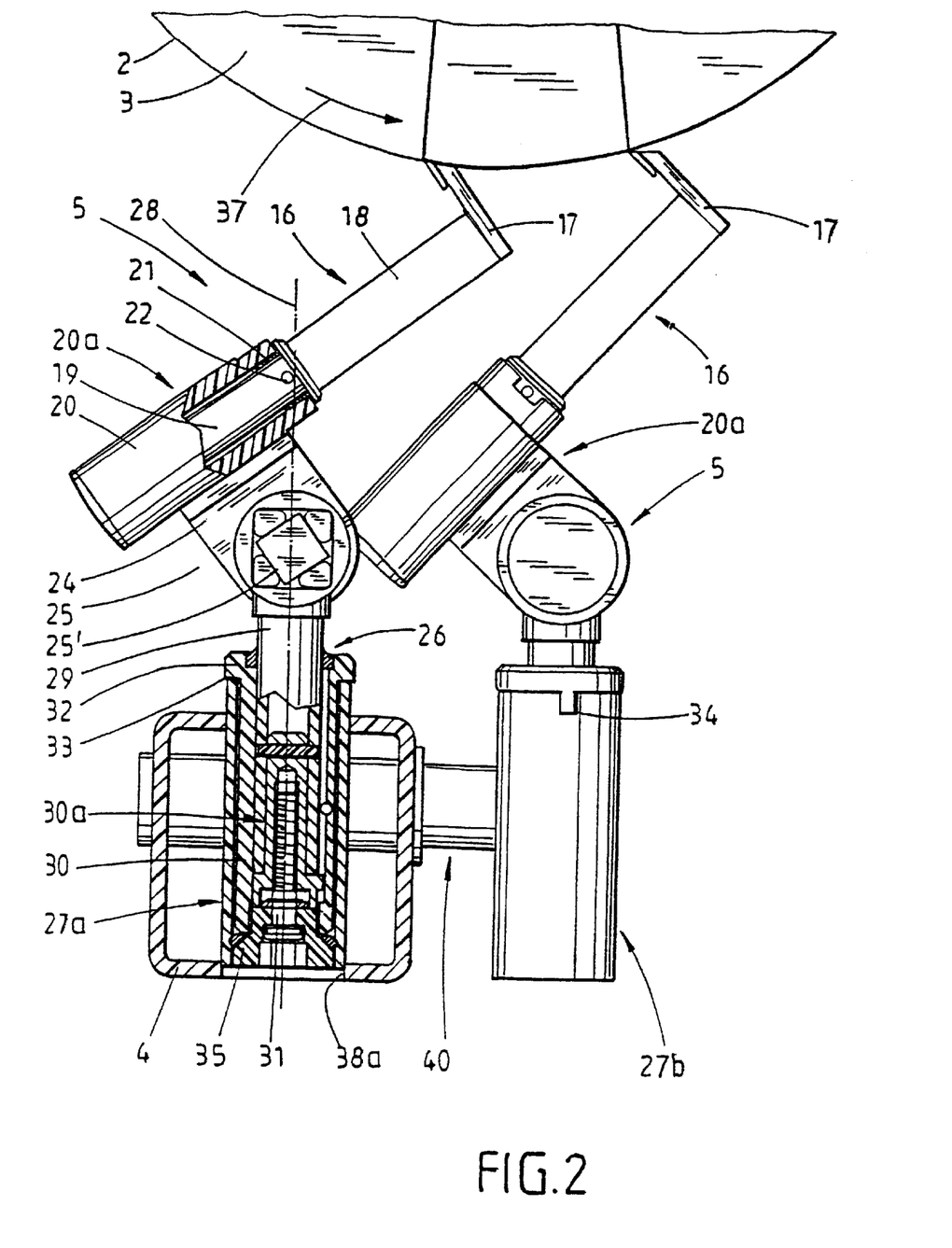
FIG. 2 is a side view, scaled up by comparison with FIG. 1, of the two stripping members of the stripping arrangement of FIG. 1, arranged on a systems support and shown partially in cross-section.
Figure 3:
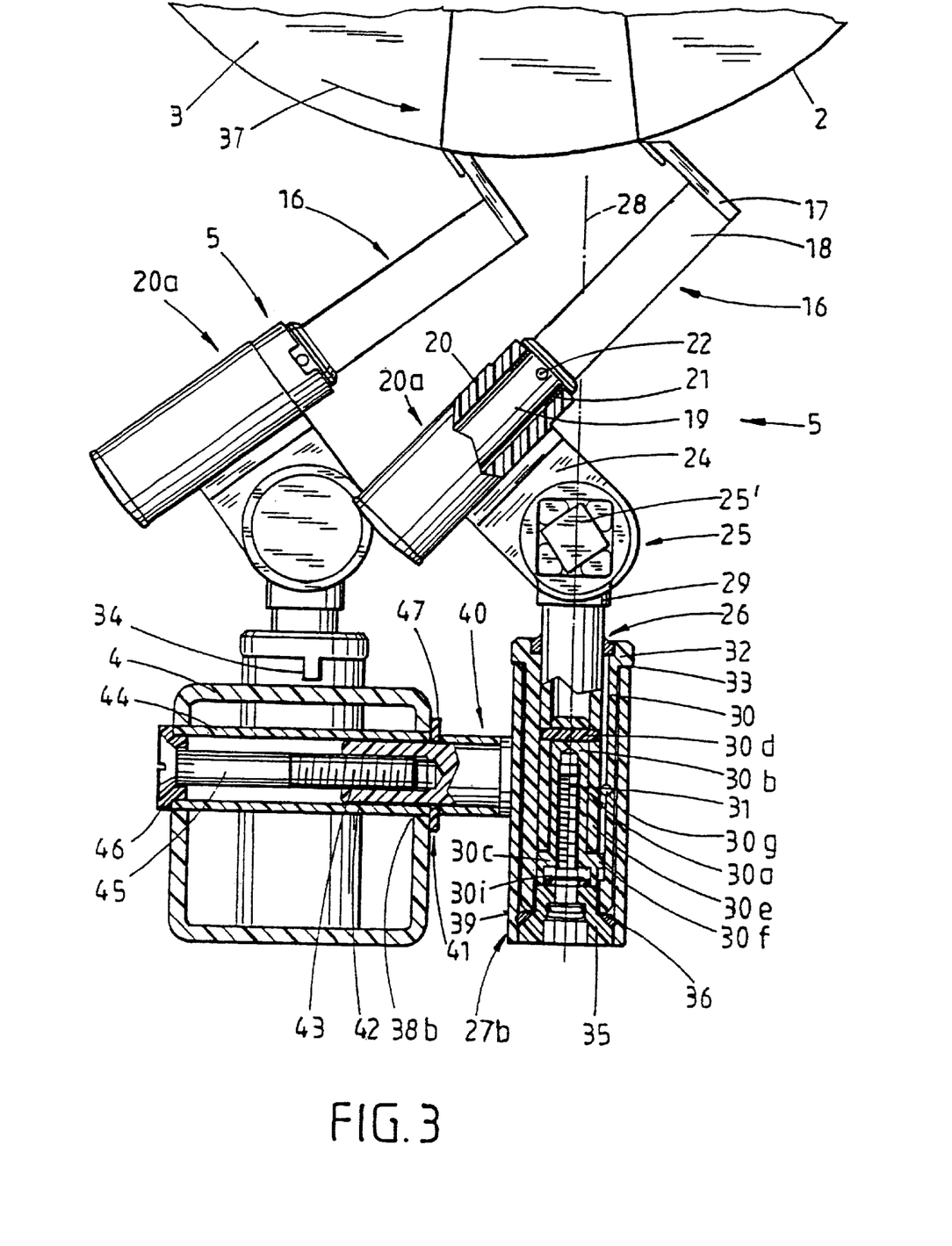
FIG. 3 is a side view of the stripping arrangement as in FIG. 2, but in a different cross-section.
Figure 4:
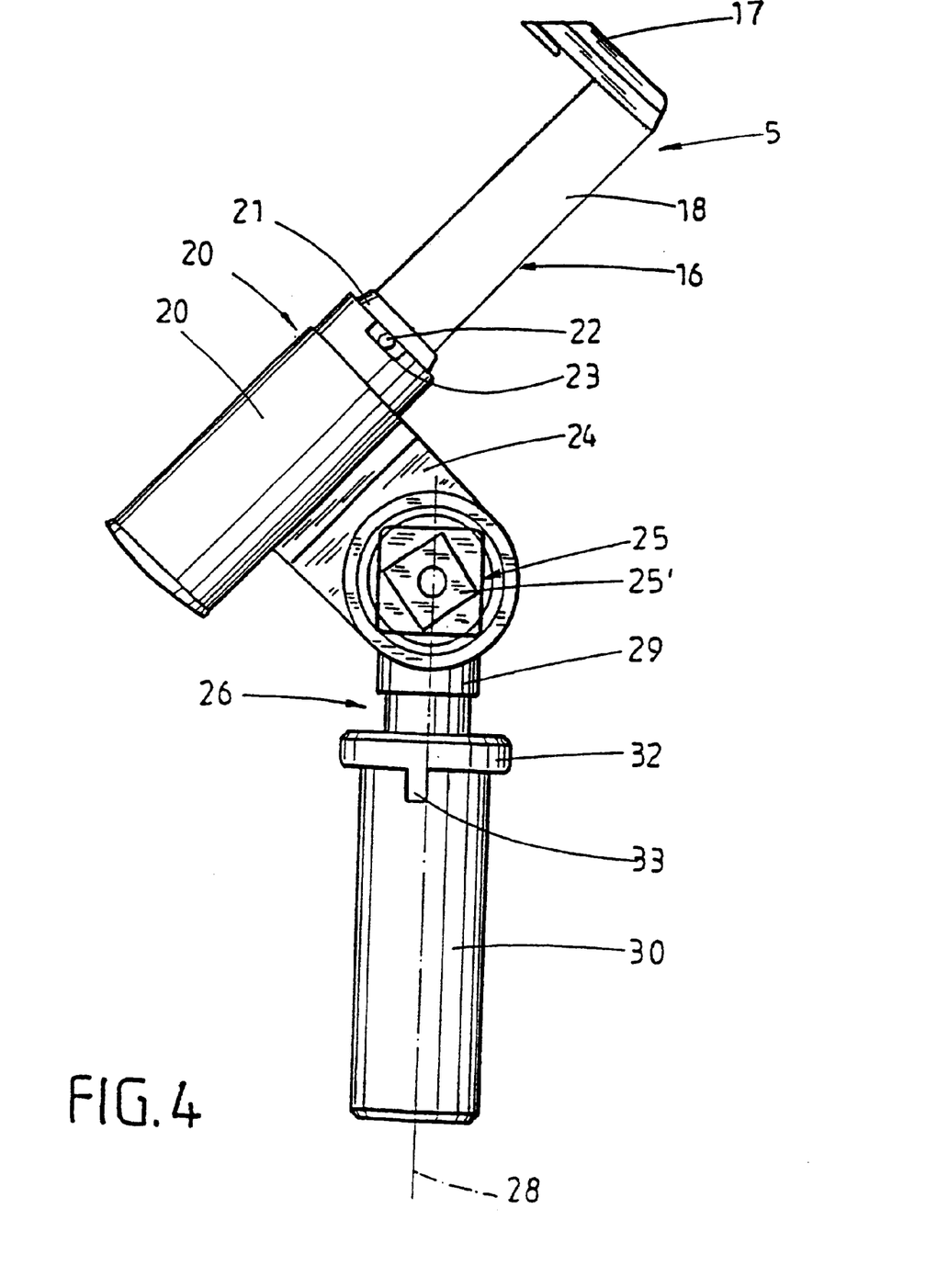
FIG. 4 is a side view of a stripping member of the arrangement according to FIGS. 1 to 3.

FIGS. 2 to 4 show the design of the stripping members 5, according to a first embodiment, and their arrangement on the systems support 4 which, in that section which supports the stripping members 5, has a square cross-section.

Each stripping member 5 comprises a blade support 16 on which is arranged a scraper blade 17 which, in the ready-to-operate position, abuts against the belt band 2 to strip the latter in a peeling manner. The blade support 16 comprises a flat profiled member 18 which, at its upper end, supports the scraper blade 17 and, at its lower end, passes over into a bolt 19 which is supported for limited rotation in a pivot bearing 20a comprising a bearing sleeve 20. The bolt 19 is secured in position axially in the bearing sleeve and comprises a flange 21 in the transition region toward the profiled member 18, the diameter of which flange is greater than the diameter of the bolt 19, said flange being supported in a recess provided at the upper end of the bearing sleeve 20. The flange 21 comprises two diametrically opposite pins 22 which are guided in recesses 23 in the end face of the bearing sleeve (20), which recesses have the shape of a section of a circular arc (see FIG. 4), such that the blade support 16 is limitedly rotatable in the bearing sleeve 20 through a specific angle which is between 15° and 30° and is, for example, 25°.

A laterally projecting plate 24, which connects the bearing sleeve 20 to a cross-sectionally square shaft 25 of a torsion spring joint 25, is welded on to the peripheral surface of the bearing sleeve 20. As a result hereof, it is possible to pivot the blade support 16, together with the scraper blade 17, such that the scraper blade 17 is raised from the belt band 2, for example when an unevenness of the belt band comes into contact with the scraper blade 17. Accordingly, one end (shaft 25) of the torsion spring joint 25 is connected to the bearing sleeve 20 and to the blade support 16 and the other end, i.e. its housing, is secured on a plug-in means 26. The latter is secured against rotation, being supported either in a holding means 27a which is arranged in the systems support 4 itself, or in a holding means 27b which is indirectly connected to the systems support 4. The point of intersection of the longitudinal axis 28 of the plug-in means 26 with the belt band 2 is disposed, in each case in the direction of rotation of the roller 3, upstream of the line of abutment of the scraper blade 17 on the belt band 2, as is shown in the drawing.

The plug-in means 26 comprises a shaft 29 which is secured against rotation but is axially adjustably arranged in a sleeve 30 which is mounted in the holding means 27a or 27b. An adjusting screw 31 is provided for the axial adjustment of the shaft 29. In order to prevent a rotation of the sleeve 30 in the holding means 27a or 27b, the sleeve 30 comprises a flange 32, which is supported on the annular end face of the holding means 27a or 27b and is provided with two diametrically opposed projections 33 which engage in recesses 34 in the holding means 27a or 27b.

The plug-in means 26 is secured in the holding means 27a or 27b by means of a securing screw 35 which is screwed into an internal screw thread provided in the lower portion of the sleeve 30. The securing screw 35 is an hexagonal socket screw having a circular edge, the diameter of which is slightly smaller than the inside diameter of the holding means 27a or 27b. The plug-in means 26 is axially locked in position, and also secured against rotation, in the holding means 27a or 27b, when the edge of the securing screw 35, via a conical face, presses an O-ring seal 36 outwardly against the inside wall of the sleeve 30 in a groove provided there in the bottom end of the sleeve 30. In this position, the securing screw is secured in the holding means 27a, 27b by frictional engagement.

An adjusting bush 30a, on the collar 30c of which the shaft 29 is axially supported, is arranged in the sleeve 30 so as to be vertically adjustable. The adjusting bush 30a, via a tenon member 30b, engages in the tubular shaft 29 and is secured there on the shaft 29 by means of a tenon 30d. The adjusting bush 30a is secured against rotation by a lug 30f which projects laterally from the collar 30c and is axially guided in a longitudinal groove 30e in the sleeve 30, but said adjusting screw is axially adjustable up to a pin 30g which is provided as a limit stop.

The axial adjustment of the adjusting bush 30a and, thus, a vertical adjustment of the shaft 29 relative to the sleeve 30, are brought about by means of the adjusting screw 31 which is arranged within the securing screw 35 so as to rotate but is secured in position in the axial direction, this being ensured, on the one hand, by the screw head and, on the other hand, by a shaft-securing ring 30i having a subjacent washer 30k, said ring being placed in position in a groove which is cut into the adjusting screw 31. It is possible for the adjusting screw 31, which is designed to be an hexagonal socket screw, to be rotated to and fro without restraint. In so doing, it is secured in the axial direction by the shaft-securing ring 30i or by the head, such that a rotary movement of the adjusting screw 31 brings about an axial movement of the adjusting bush 30a into which it is screwed, as is shown in the drawing. As already mentioned, the adjusting bush 30a cannot rotate conjointly with the adjusting screw 31, since the lug 30f in the longitudinal groove 30e prevents a rotary movement. The adjusting screw 31, in turn, is secured, by frictional engagement, against self-actuated adjustment by means of an O-ring seal.

When a stripping member 5 is to be removed from a tubular holding means 27a, 27b, the securing screw 35 in the holding means 27a or 27b is, as a first step, unscrewed. The stripping member 5 can then be pulled out of the holding means 27a or 27b from above. The steps are reversed in the case of the assembling operation. The respectively desired vertical adjustment of the stripping member 5 relative to the belt band 2 on the roller 3 is provided, in a simple manner, by rotation of the adjusting screw 31.

The holding means 27a, which is illustrated in cross-section in FIG. 2, is mounted in an opening 38a arranged in the systems support 4 and is welded to the systems support 4.

The holding means 27b, which is illustrated in cross-section in FIG. 3, comprises a plug-in bolt 40 which protrudes laterally and is weldingly attached to its peripheral surface 39. Said plug-in bolt comprises a shoulder 41 and a free end 42 which is provided with a tapped hole 43 and engages in a bush 44 which passes through the systems support 4 and is secured therein. The plug-in bolt 40 is attached to the systems support 4 by means of a screw 45 which is introduced into the bush 44 from the left-hand side (referring to the drawing) and is screwed into the tapped hole 43. A washer 46 is arranged between the head of the screw 45 and the opening rim of the bush 44. The opening 38b in which the bush 44 is secured extends perpendicularly relative to the opening 38a for the holding means 27a in the systems support 4.

It can be seen, in particular from FIG. 3, that a distance ring 47 is pushed on to the shouldered free end 42 of the plug-in bolt 40, and said ring abuts between the shoulder 41 and the outer surface of the systems support 4. By means of the distance ring 47, it is possible for the holding means 27b to be locked in position on the systems support 4 in predetermined positions selected in terms of the diameter of the roller 3, in order to ensure a predetermined position of the stripping member mounted in the holding means 27b.

Figure 5:
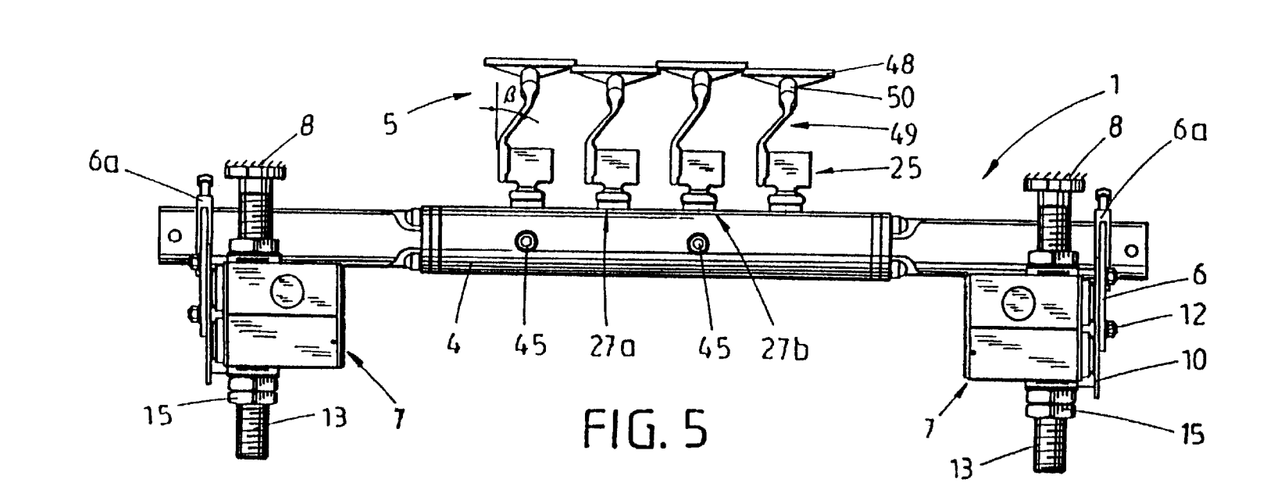
FIG. 5 is a front view of a second embodiment of the stripping arrangement comprising a plurality of stripping members to strip a belt band.
Figure 6:
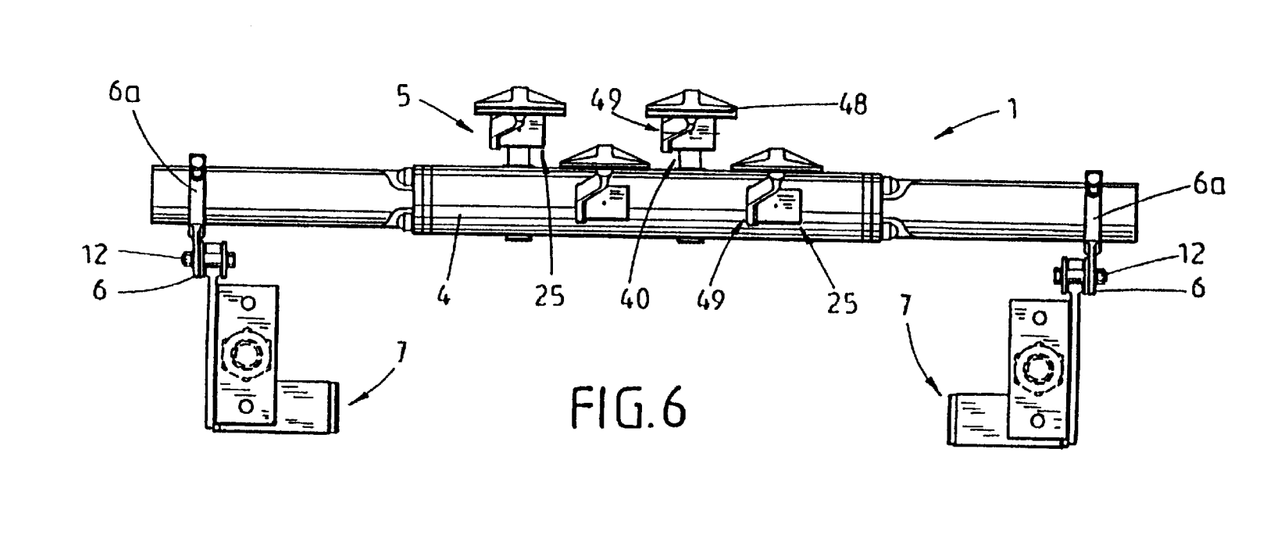
FIG. 6 is a plan view of the stripping arrangement of FIG. 5.
Figure 7:
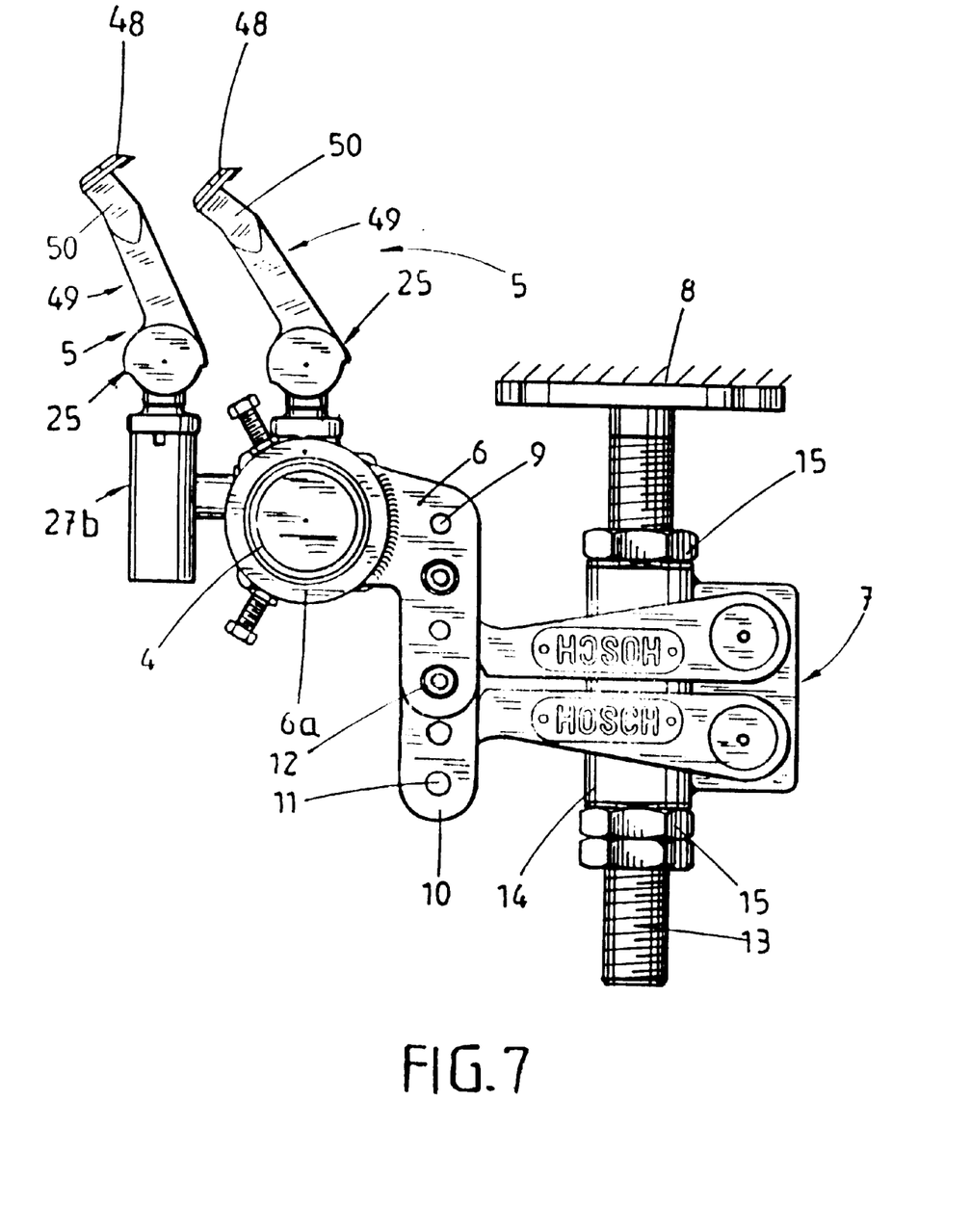
FIG. 7 is a side view of the stripping arrangement of FIGS. 5 and 6.

FIGS. 5 to 7 show an arrangement 1 to strip conveyor belts or belt bands, which arrangement comprises four stripping members 5 which are arranged on the systems support 4 staggered in two rows one behind the other. As far as the basic design and, in particular, the manner of attachment to the systems support 4, i.e. regarding the use of the holding means 27a and 27b and the plug-in means 26 which co-operates therewith, are concerned, this embodiment corresponds to the previously described embodiment. The stripping members 5 of the second embodiment differ fundamentally in that they do not comprise a pivot bearing 20a, attached to the torsion spring joint 25, for the blade support 16. Instead, in the case of the stripping members 5 illustrated in FIGS. 5 to 7 the capacity to pivot and, thus, the automatic adjustability of the scraper blade 48 is achieved in that a pivot bearing 50 is arranged between the blade support 49 and the scraper blade 48 immediately below the scraper blade 48. In this embodiment, the blade support 49, at the top, is designed as a tubular member into which is introduced a pivot pin which is arranged on the scraper blade 48 for limited rotation. It is, however, also possible to provide the scraper blade 48, at its lower side, with a tubular bearing bush in which a bearing journal, which is attached to or structured on the upper end of the blade support 49, is supported for limited rotation.

The bottom end of the blade support 49 is directly firmly connected to the square shaft of the torsion spring joint 25, the square shaft not being shown in FIGS. 5 to 7.

As can be seen, in particular in FIG. 5, the blade support 49 is bent in the region between its end which is firmly connected to the torsion spring joint 25 and the pivot bearing 50 through, in each case, an angle β, such that the center of the scraper blade 48 is disposed in the center plane of the associated torsion spring joint 25.

It can be seen from FIGS. 5 to 7 that adjacent stripping members are equidistantly arranged alternately in holding means 27a and 27b. The spacings between adjacent stripping members 5 are selected such that their scraper blades 48 can be arranged to overlap partially on the belt band 2, such that overlapping cleaning regions of the scraper blades 48 are provided.

Figure 8:
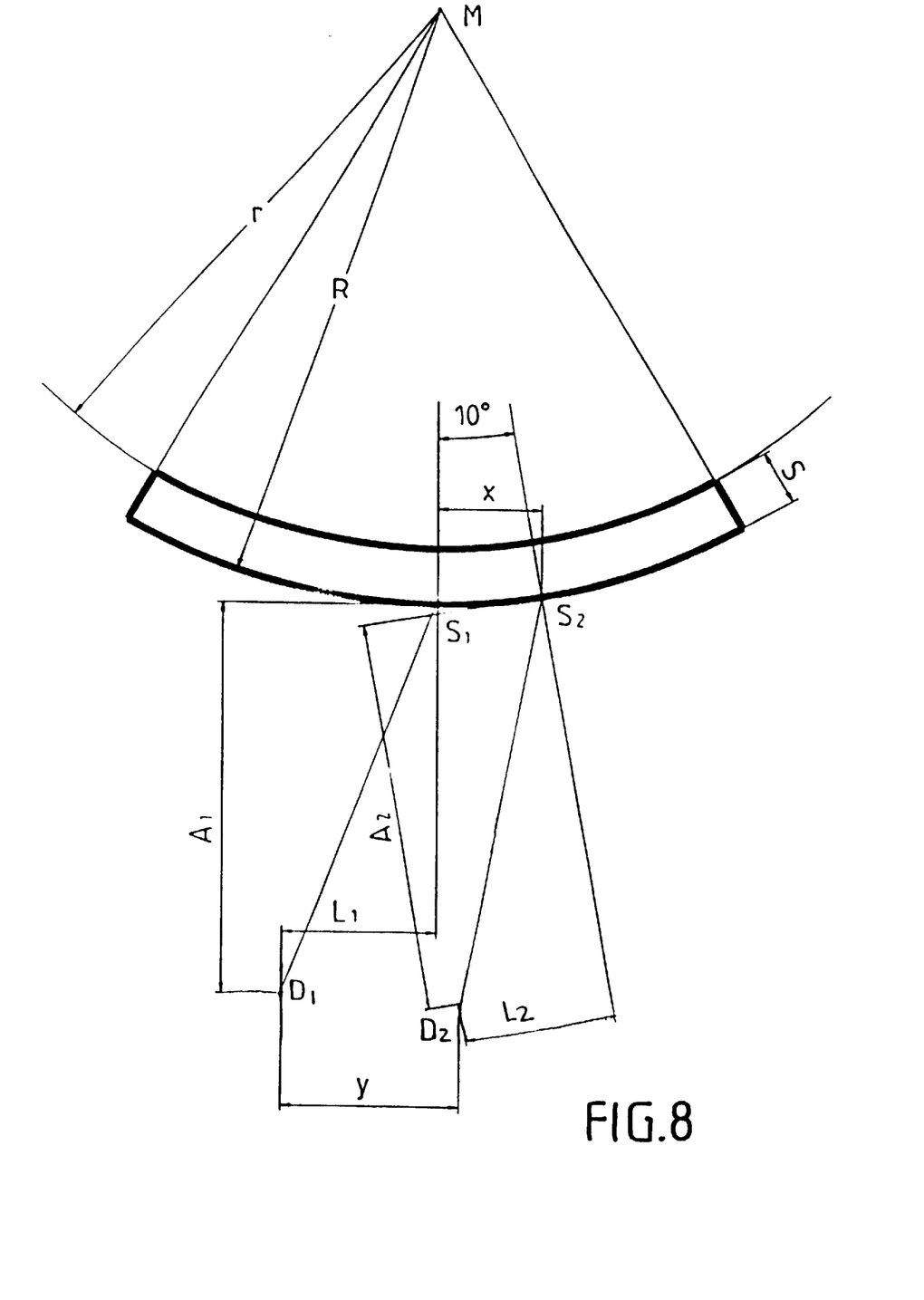
FIG. 8 is a diagrammatic illustration of the geometric ratios of stripping members which are arranged in double rows and are in a ready-to-operate position on the belt band.

FIG. 8 diagrammatically shows the geometric ratios of a preferred embodiment of the arrangement according to the invention, by means of which an optimal operational behavior, in particular a continuous abutment of the scraper blades 17, 48 on the belt band 2 with an automatic adjustment of the angle and a smooth and steady cleaning of the belt band, without any residues continuing to adhere to the belt band 2, can be achieved.

The aspect ratios of the individual line segments, which will be designated hereinafter, correspond to an exemplified embodiment which has proved successful in practice and which is represented true to scale but scaled down.

FIG. 8 shows the central axis M of the roller 3 and its radius r. The belt band 2 disposed on the roller 3 has a thickness s. The sum total of the radius r of the roller 3 and the thickness s of the belt band 2 is indicated by the line segment R.

The contact line of the cutting edges of the blades from the first row of stripping members is designated by the reference symbol $S_1$, and the contact line of the cutting edges of the blades from the second row of stripping members by $S_2$.

The torsion spring axis of the first row of stripping members is designated by the reference symbol $D_1$, and the torsion spring axis of the second row of stripping members by $D_2$.

The reference symbol x designates the spacing of the contact line $S_1$ of the first row of stripping members from the contact line $S_2$ of the second row of stripping members as a function of the sum total of the radius r of the roller 3 and the thickness s of the belt band. The reference symbol y designates the spacing of the torsion spring axis $D_1$ of the first row of stripping members from the torsion spring axis $D_2$ of the second row of stripping members, also as a function of the sum total of the radius r of the roller 3 and the thickness s of the belt band.

Reference symbols $A_1$ and $A_2$ designate the spacing between the torsion spring axis $D_1$ of the first row of stripping members, or between the torsion spring axis $D_2$ of the second row of stripping members, respectively, from a tangent line which extends through the contact line $S_1$ of the first row of stripping members or through the contact line $S_2$ of the second row of stripping members, respectively.

FIG. 8 shows the spacing $L_1$ between the torsion spring axis $D_1$ of the first row of stripping members and the radius r which extends through the contact line $S_1$ of the first row of stripping members, and also the spacing $L_2$ between the torsion spring axis $D_2$ of the second row of stripping members and the extended radius r of the roller 3 extending through the contact line $S_2$ of the second row of stripping members.

It has been found to be particularly advantageous when the contact line $S_1$ of the first row of stripping members is arranged at a spacing from the contact line $S_2$ of the second row of stripping members such that the two radii r of the roller 3, which radii extend through these two contact lines, encompass an angle of 10°.

I claim:

1. A system to strip unwanted matter from belt bands in conveyor belt installations in the region of a driving and/or direction-changing roller of the belt band, comprising a systems support which is attached to a supporting structure for the belt band and on which at least one stripping member is arranged, the stripping member comprising a scraper blade which is attached to a blade support, which scraper blade, in the ready-to-operate position, abuts against the belt band and comprises a torsion spring joint on which the blade support is guided in a spring-loaded manner and so as to pivot about a horizontal pivot axis such that, when the scraper blade encounters obstacles which rigidly adhere to the belt band, it can pivot away and subsequently again pivot back into the working position on the belt band, in which the blade support is pivotally supported by a pivot bearing having a limited pivot angle, such that the scraper blade which abuts against the belt band can adjust to changes in inclination of the belt band in the immediate contact region of the scraper blade by pivoting automatically, and in which the torsion spring joint is attached to a plug-in means which is arranged in a holding means which is attached to the systems support wherein, the plug-in means comprises a shaft and a sleeve for mounting in the holding means, in which sleeve the shaft is supported to be rotationally fixed and manually adjustable in the axial direction, the holding means comprises a plug-in bolt which is attached to its peripheral surface and is introduced into a lateral opening of the systems support and is secured therein, the longitudinal axis of which bolt extends perpendicularly relative to the longitudinal axis of the holding means and the longitudinal axis of the plug-in means intersects the belt band at a point which, in the direction of rotation of the roller, is disposed upstream of the contact line of the scraper blade.

2. A system according to claim 1, in which the pivot bearing is arranged between the scraper blade and the torsion spring joint.

3. A system according to claim 1 or claim 2, in which the holding means is secured in an opening of the systems support, the longitudinal axis of which opening extends in the direction of the belt band.

4. A system according to one of claims 1 or 2, in which the blade support, beyond the bearing sleeve, or between the pivot bearing and the torsion spring joint is designed to be plate-like, the narrow side of the blade support facing the conveyor belt.

5. A system according to one of claims 1 or 2, in which the pivot bearing is designed for manual use in order to set and adjust the angle of the blade support or the scraper blade.

6. A system according to one of claims 1 or 2, in which the angle of the swivelling range of the freely rotating pivot bearing is between 15° and 30°, preferably 25°.

7. A system according to one of claims 1 or 2, in which a bearing sleeve is provided with at least one recess in which a limiting device, e.g. a pin which is connected to the blade support is guided, in order to limit the pivot angle between the blade support and the bearing sleeve.

8. A system according to one of claims 1 or 2, in which a bearing sleeve is attached, preferably peripherally, on the torsion spring joint such that its longitudinal axis is spaced from the axis of the torsion spring joint.

9. A system according to one of claims 1 or 2, in which the blade support, with its end which faces away from the scraper blade, is attached to the torsion spring joint and is resiliently rotatable, relative to the plug-in means, about the articulated axle of the torsion spring joint.

10. A system according to one of claims 1 or 2, in which the blade support is bent at an angle in the direction of the torsion spring joint such that the center plane of the scraper blade is disposed substantially in or near the center plane of the plug-in means.

11. A system according to one of claims 1 or 2, in which, when the scraper blades are arranged in two rows along the systems support, the axis of the torsion spring of the second row of scraper blades is disposed in the same geometric co-ordination relative to the contact line as the axis of the torsion spring of the first row of scraper blades relative to the contact line.

12. A system according to claim 1, in which the systems support is provided with openings which extend equidistantly at right angles to each other, for the mounting of the holding means and to introduce the plug-in bolts, such that blade supports can be provided in two parallel rows.

13. A system according to claim 12, in which the openings for the plug-in bolt and the openings for the holding means are arranged to alternate along the systems support.

14. A system according to claim 1, in which a flange, which is supported on the annular surface of the holding means, is arranged on the sleeve.

15. A system according to claim 14, in which at least one recess is provided at the upper end of the holding means, into which recess a correspondingly designed projection of the plug-in means engages as a means to secure against rotation.

16. A system according to claim 1, in which an adjusting bush is arranged in the sleeve in a manner so as to be vertically adjustable, on which bush the shaft is axially supported.

17. A system according to claim 16, in which a tenon member of the adjusting bush engages in the tubular shaft and is there attached to the shaft and, by means of a collar, engages under the shaft and is connected to the sleeve to be rotationally fixed but axially adjustable.

18. A system according to one of claims 1 or 2, in which the plug-in bolt comprises a shoulder and a free end following thereon, which free end comprises a tapped hole and engages in a bush which is secured in the systems support, the plug-in bolt being attached to the systems support by means of a screw which passes through the bush and is screwed into the tapped hole.

19. A system according to claim 18, in which a distance ring is arranged on the free end of the plug-in bolt between the shoulder and the outer surface of the systems support.

* * * * *